US007725727B2

(12) United States Patent
Jennings

(10) Patent No.: US 7,725,727 B2
(45) Date of Patent: May 25, 2010

(54) AUTOMATIC SIGNATURE GENERATION FOR CONTENT RECOGNITION

(75) Inventor: James Scott Jennings, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 11/142,090

(22) Filed: Jun. 1, 2005

(65) Prior Publication Data

US 2006/0288217 A1    Dec. 21, 2006

(51) Int. Cl.
  *G06F 17/00*    (2006.01)
(52) U.S. Cl. ..................................... 713/177; 707/102
(58) Field of Classification Search ................ 713/176, 713/177; 707/102
  See application file for complete search history.

(56) References Cited

U.S. PATENT DOCUMENTS

| 4,028,674 | A |   | 6/1977  | Chuang ............. 340/146.3 SY |
|-----------|---|---|---------|----------------------------------|
| 5,031,134 | A | * | 7/1991  | Kaplan et al. ............... 708/444 |
| 6,137,909 | A |   | 10/2000 | Greineder et al. ........... 382/190 |
| 6,574,657 | B1| * | 6/2003  | Dickinson ................... 709/203 |
| 2001/0043738 | A1 |   | 11/2001 | Sawhney et al. ............ 382/154 |
| 2003/0009295 | A1 | * | 1/2003  | Markowitz et al. ............ 702/20 |
| 2004/0030776 | A1 | * | 2/2004  | Cantrell et al. .............. 709/224 |
| 2004/0044707 | A1 | * | 3/2004  | Richard ....................... 707/204 |
| 2004/0044900 | A1 | * | 3/2004  | Wang et al. .................. 713/193 |
| 2004/0250124 | A1 | * | 12/2004 | Chesla et al. ............... 713/201 |
| 2005/0086254 | A1 | * | 4/2005  | Zou et al. .................... 707/102 |

* cited by examiner

*Primary Examiner*—Brandon S Hoffman
*Assistant Examiner*—Travis Pogmore
(74) *Attorney, Agent, or Firm*—VanLeeuwen & VanLeeuwen; Robert E. Straight, II

(57) ABSTRACT

A user provides signature attributes to a computer system for generating a signature, such as content directories, a signature accuracy level, and whether an existing signature database exists. The computer system generates a signature and the user tests the signature against a test file system. Based on the test results, the user may refine the signature using a different file system or a different content installation. In one embodiment, a user may generate a parent signature from existing "child" signatures that correspond to different versions of particular content. For example, a user may wish to generate a "Program" parent signature using children signatures "program v.0," "program v.1," and "program v.2." When the user is satisfied with the signature, the user may use the signature to detect content that is located in a computer device's file system.

12 Claims, 8 Drawing Sheets

AUTOMATIC SIGNATURE GENERATION FOR CONTENT RECOGNITION

BACKGROUND OF THE INVENTION

1. Technical Field

The present invention relates in general to a system and method for automatic signature generation for content recognition. More particularly, the present invention relates to a system and method for using a selection algorithm to select particular files and directories in a file system, and automatically generate a signature based upon the selected files and directories.

2. Description of the Related Art

Computer networks may include hundreds of devices such as servers and clients. Each of these computer devices includes a file system that stores content, such as program files and non-program files. File system content may include word processing programs, spreadsheet programs, database management programs, documentation files, web content, collections of spreadsheets, and program source code files. For asset management, systems management, and configuration management purposes, a system administrator is required to track the content of each of these computer devices.

Tracking the content that resides on a multitude of computer devices, especially those in large computer networks, may be virtually impossible without an automated method. One automated approach is to use a "signature" to detect content that resides on computer devices. A signature includes information about files that correspond to a software program or a non-program content set. A matching algorithm compares the signature with the set of files that reside on a computer device's file system. If the matching algorithm returns a positive result, the computer device is logged as having the software program or non-program content set on its file system corresponding to the signature.

Some signatures include one file with one file size, which may not be an accurate characterization of a software application or another set of files, such as web content or documentation. A challenge found is that existing signatures may be overly sensitive to variations in file name and size due to applied patches and/or installation options. Another challenge found is that existing signatures do not identify partial matches. Meaning, either the signature identifies a match with a file system or it does not.

Yet another challenge found is that when a new version of an application is released, a new signature must be created in order to detect the new application version in a file system. Creating a new signature requires careful examination of the new version and each of its previous versions simultaneously in order to identify a file name and size that reliably differentiates the new version from the old versions, which is difficult and time consuming.

What is needed, therefore, is a system and method to automatically generate signatures for use in content identification that resides on computer devices.

SUMMARY

It has been discovered that the aforementioned challenges are resolved using a system and method for using a selection algorithm to select particular files and directories in a file system, and automatically generate a signature based upon the selected files and directories. A user instructs a computer system to generate a signature that corresponds to particular file system content. In turn, the computer system displays a new signature generation window that allows the user to provide signature attributes to the computer system, such as whether the content's directories are known, a signature accuracy level, and whether an existing signature database exists.

The user provides the signature attributes to the computer system, and the computer system's signature generator uses the signature attributes and a selection algorithm to select files and directories corresponding to the content. For example, the signature attributes may include particular content directories for the signature generator to use during the signature generation process. In this example, processing uses the algorithm to select files that are included in the particular directories. In another example, the signature attributes may include the name and location of the content's executable file. In this example, the signature generator analyzes the executable file and identifies files and directories that the executable file depends, such as shared library files. As such, the selection algorithm uses the identified directories to select files that are incorporated into the signature.

The signature attributes may also include a specified accuracy level, such as a "screened" or a "precise" accuracy level, which is used to generate a screened signature or a precise signature, respectively. A screened signature includes less files and directories than a precise signature. Therefore, a screened signature analyzes a computer device's file system for content faster than a precise signature. However, a screened signature's results are prone to a higher rate of false positives (false matches) than a precise signature's results.

The signature generator selects a number of files consistent with the specified accuracy level and stores the selected files' properties in a temporary storage area. The file properties include file names and their corresponding directories. Once the signature generator has selected the appropriate number of files, the signature generator uses the file properties to generate the signature.

When the user wishes to test the new signature's accuracy, the user's computer system sends the signature to a test client. The test client may be local or the test client may be at a remote location. The test client uses the signature to determine whether the test client's file system includes the corresponding content. After testing, the test client sends a test result back to the user's computer system.

The user's computer system provides the test result to the user. Subsequently, the user may wish to refine the signature based upon the test result. For example, the test result may inform the user that the test client's file system includes the corresponding content but, however, the user knows that the test client's file system does not include the content. In this example, the user may wish to refine the signature in order to make the signature more accurate. Continuing with this example, the user may request the signature generator to refine the signature using a different accuracy level, or to generate a new signature using the content on the test client as well as the original signature's corresponding content installation. Once the user is satisfied with the signature, the user may use the signature to identify computer devices whose file systems include content that correspond to the signature.

In one embodiment, the user may wish to generate a parent signature from existing "child" signatures that encompass different versions of particular content. For example, a user may wish to generate a "Program" parent signature using children signatures "program v.0," "program v.1," and "program v.2." In this embodiment, the user provides child signature names to the signature generator and the signature generator identifies commonalities, or an intersection, between the child signatures. In turn, the signature generator generates a parent signature based upon the child signature commonalities.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
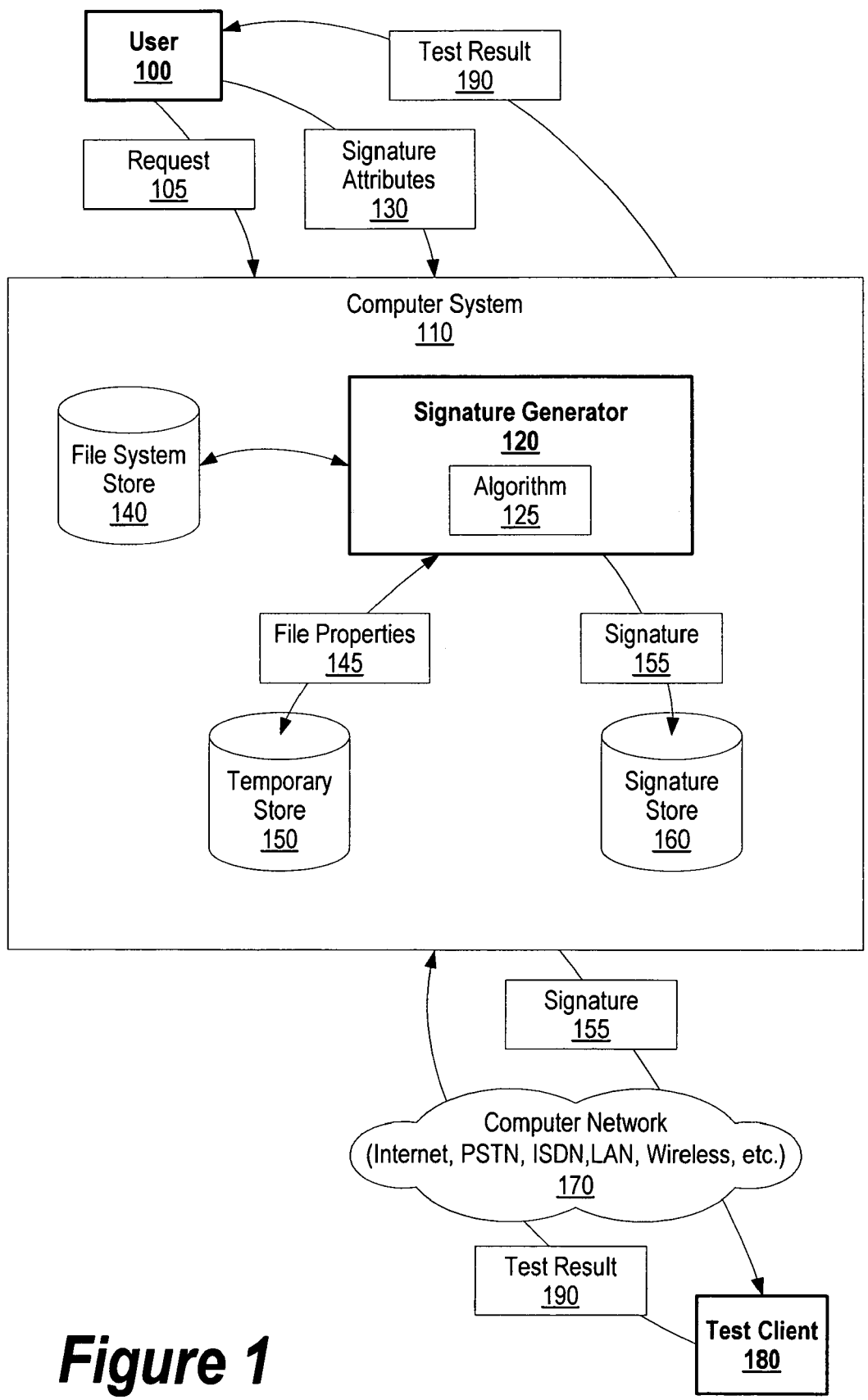
FIG. 1 is a diagram showing a signature generator automatically generating and testing a signature.

FIG. 1 is a diagram showing a signature generator automatically generating and testing a signature. User 100 wishes to generate a signature for detecting particular content. For example, user 100 may wish to generate a signature for a web browser application for use in identifying computer devices that have the particular web browser application included in their file system.

Computer system 110 receives request 105 from user 100. In turn, computer system 110 displays a new signature generation window that allows user 100 to provide attributes for the signature generation, such as whether the content's directories are known, a signature accuracy level, and whether an existing signature database exists (see FIG. 2A and corresponding text for further details regarding signature generation window properties).

User 100 uses the signature generation window to provide signature attributes 130 to computer system 110. In turn, signature generator 120 uses signature attributes 130 and selection algorithm 125 to select files and directories that are located in file system store 140 for the signature generation. For example, signature attributes 130 may include particular content directories for signature generator 120 to use during the signature generation process. In this example, processing uses selection algorithm 125 to select files that are included in the particular directories. In another example, signature attributes 130 may include the name and location of the content's executable file. In this example, signature generator 120 analyzes the executable file and identifies files and directories that the executable file depends, such as shared library files. In turn, selection algorithm 125 uses the identified directories to select files to incorporate into the signature (see FIG. 4 and corresponding text for further details regarding file location steps). File system store 140 may be stored on a nonvolatile storage area, such as a computer hard drive.

Signature attributes 130 may also include a specified accuracy level, such as "screened" or "precise." A screened signature includes less files and directories than a precise signature. Therefore, a screened signature analyzes a computer device's file system for content faster than a precise signature. However, a screened signature's results are prone to a higher rate of false positives (false matches) than a precise signature's results.

Signature generator 120 selects a number of files consistent with the specified accuracy level and stores the selected files' properties (i.e. file properties 145) in temporary store 150. File properties 145 include file names and their corresponding directories. Once signature generator 120 has selected the appropriate number of files, signature generator 120 uses file properties 145 to generate signature 155, which it stores in signature store 160. Temporary store 150 and signature store 160 may be stored on a nonvolatile storage area, such as a computer hard drive.

When user 100 wishes to test signature 155's accuracy, computer system 110 sends signature 155 to test client 180 over computer network 170, such as the Internet. Test client 180 uses signature 155 to determine whether test client 180's file system includes the corresponding content. After testing, test client 180 sends test result 190 to computer system 110 over computer network 170.

Computer system 110 provides test result 190 to user 100. Subsequently, user 100 may wish to refine signature 155 based upon test result 190. For example, test result 190 may inform user 100 that test client 180's file system includes the corresponding content but, however, user 100 knows that test client 180's file system does not include the content. In this example, user 100 may wish to refine signature 155 in order to make it more accurate. Therefore, user 100 may request signature generator 120 to refine signature 155 using a different accuracy level or to generate a new signature using the content on test client 180 as well as the original signature's corresponding content installation (see FIG. 6 and corresponding text for further details regarding signature refinement steps).

Once user 100 is satisfied with signature 155, user 100 may use signature 155 to identify computer devices whose file systems include content that correspond to signature 155.

Figure 2A:
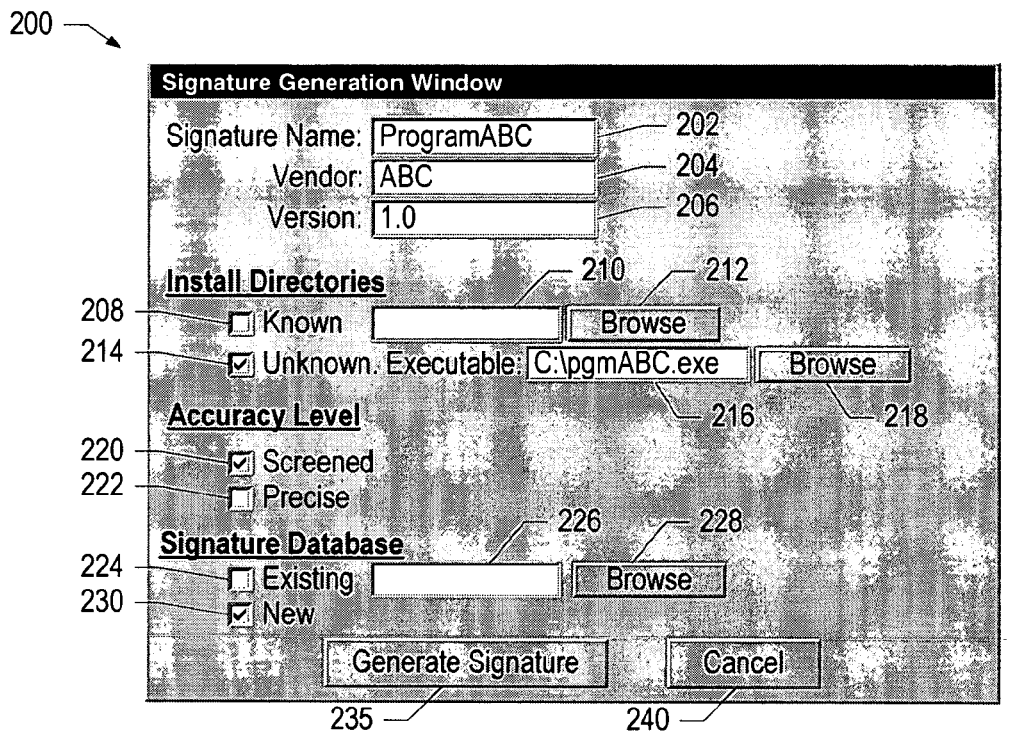
FIG. 2A is a signature generation user interface window.

FIG. 2A is a signature generation user interface window. When a signature generation tool receives a user request to generate a new signature, the user's computer system displays signature generation window 200, which allows the user to provide particular signature attributes.

Window 200 includes text boxes 202 through 206. A user enters a signature name in text box 202. In addition, the user enters the content's vendor name and version number in text boxes 204 and 206, respectively.

When the user knows the content's directories, the user selects check box 208 and enters the directories in text box 210. The user may also select command button 212 to locate the directories by browsing the file system. When the user does not know the content directories, the user selects check box 214 and enters the content's executable file name and path in text box 216. The user may select command button 218 to browse the file system in order to locate the executable file. As one skilled in the art can appreciate, the user may also identify the location of an executable file by right clicking on an executable file object and viewing the object's properties, which includes the location of the executable file.

The user also specifies an accuracy level for the signature using check box 220 or 222. The example in FIG. 2A shows that the user may select a screened accuracy level or a precise accuracy level, which generates a screened signature or a precise signature, respectively. A screened signature includes less files and directories than a precise signature. Therefore, a screened signature is faster than a precise signature at analyzing a file system for content but, however, its results are not as accurate as a precise signature's results. When the user wishes to specify a screened accuracy level, the user selects check box 220. Likewise, when the user wishes to specify a precise accuracy level, the user selects check box 222.

Window 200 also includes an area for the user to inform the signature generation tool as to whether a signature database currently exists. When a signature database exists, the user selects check box 224 and enters the signature database location and name in text box 226. The user may also select command button 228 to browse through the file system in order to locate the signature database. When a signature database does not exist, the user selects check box 230, which instructs the signature generation tool to generate a new signature database (see FIG. 4 and corresponding text for further details regarding signature database generation steps).

When the user is finished entering signature attributes in window 200, the user selects command button 235 to save the signature attributes and generate a signature. When the user wishes to terminate the signature generation process, the user selects command button 240, which cancels the signature generation process and closes window 200.

Figure 2B:
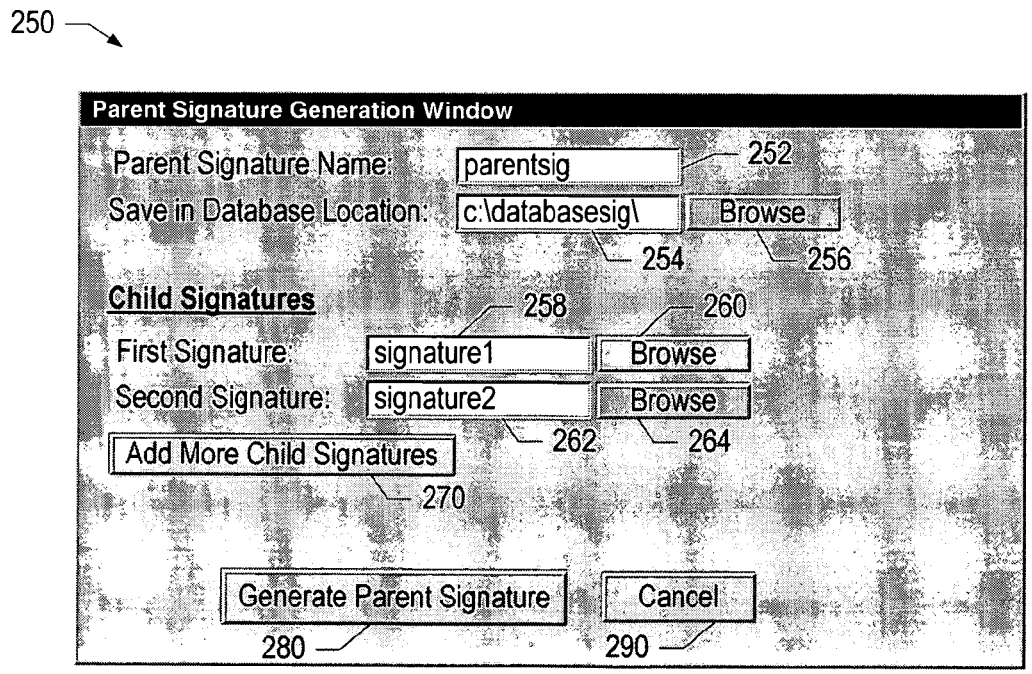
FIG. 2B is a parent signature generation window.

FIG. 2B is a parent signature generation window. A user may wish to generate a parent signature from existing "child" signatures that correspond to different versions of particular content. For example, a user may wish to generate a "Program" parent signature using children signatures "program v.0," "program v.1," and "program v.2."

When a signature generation tool receives a request to generate a parent signature, the user's computer system displays parent signature generation window 250, which allows the user to provide child signature information. The user enters a name of the parent signature in text box 252 and a database location to save the parent signature in text box 254. The user may also select command button 256 to browse through a file system in order to identify a location to save the parent signature.

Window 250 also includes an area for the user to input child signature information. The user enters child signature information in text boxes 258 and 262 or, the user may select command buttons 260 and 264 in order to browse the file system to locate a first and second child signature, respectively. If the user wishes to provide more than two child signatures, the user selects command button 270 and window 200 displays a third child signature line for the user to enter information.

When the user is finished entering child signature information into window 250, the user selects command button 280 to save the information and generate a parent signature. When the user wishes to terminate the parent signature generation process, the user selects command button 290, which cancels the parent signature generation process and closes window 250.

Figure 3A:
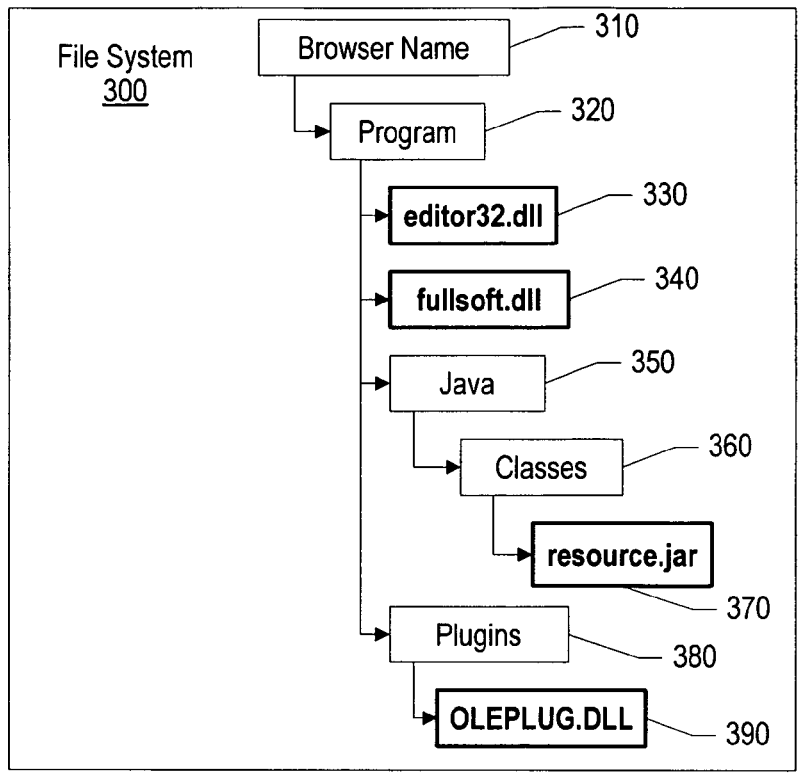
FIG. 3A is a diagram showing a signature generation tool's file selection corresponding to a precise signature.

FIG. 3A is a diagram showing a signature generation tool's file selection corresponding to a precise signature. A user instructs a signature generation tool to generate a precise signature when the user prefers content detection accuracy to file system analysis speed. File system 300 includes directories 310, 320, 350, 360, and 380. The example shown in FIG. 3A shows files in bold that the signature generation tool selects when a user specifies a precise accuracy level, which are files 330, 340, 370, and 390. As one skilled in the art can appreciate, more or less files may be selected than what is shown in FIG. 3A for a precise accuracy level.

Figure 3B:
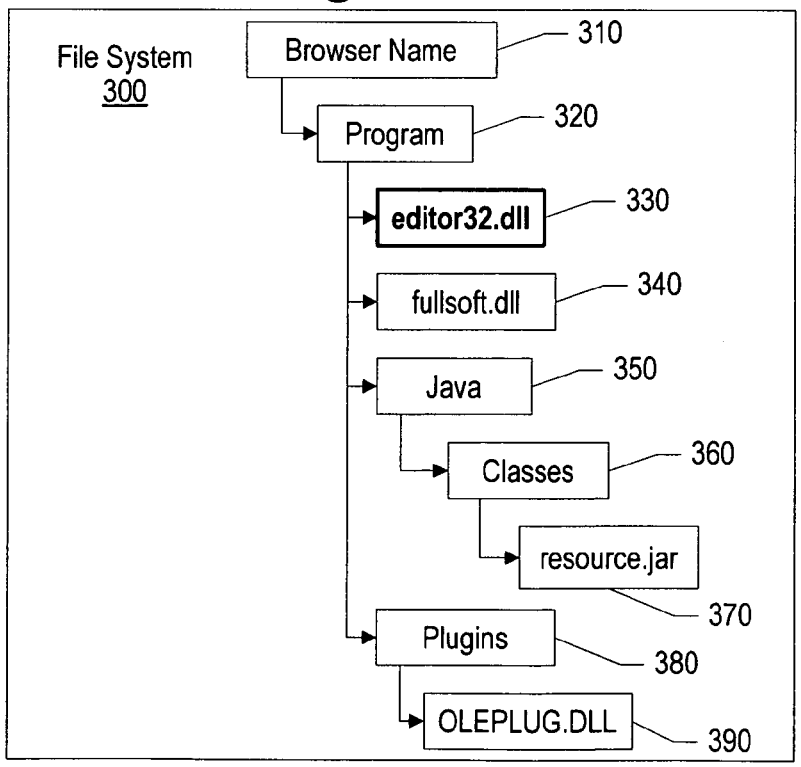
FIG. 3B is a diagram showing a signature generation tool's file selection corresponding to a screened signature.

FIG. 3B is a diagram showing a signature generation tool's file selection corresponding to a screened signature. A user instructs a signature generation tool to generate a screened signature when the user prefers file system analysis speed to content detection accuracy. FIG. 3B shows file system 300 and is similar to FIG. 3A with the exception that, in the case of a screened accuracy level, the signature generation tool selects less files to create a signature.

The example in FIG. 3B shows that the signature generation tool selects file 330 to generate a signature. As one skilled in the art can appreciate, more or less files may be selected than what is shown in FIG. 3B for a screened accuracy level.

Figure 4:
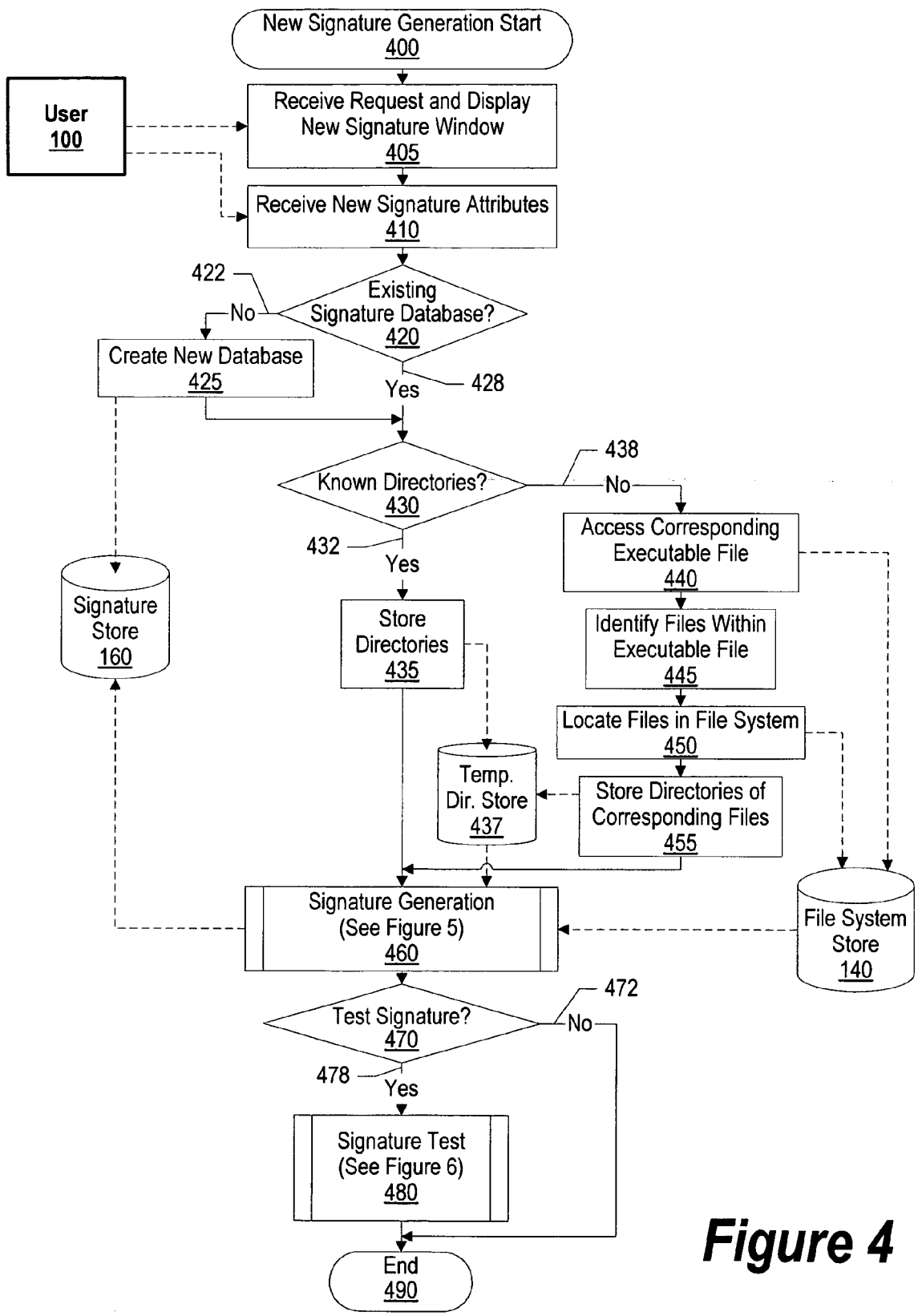
FIG. 4 is a high level flowchart showing steps taken in generating and testing a signature.
Figure 7:
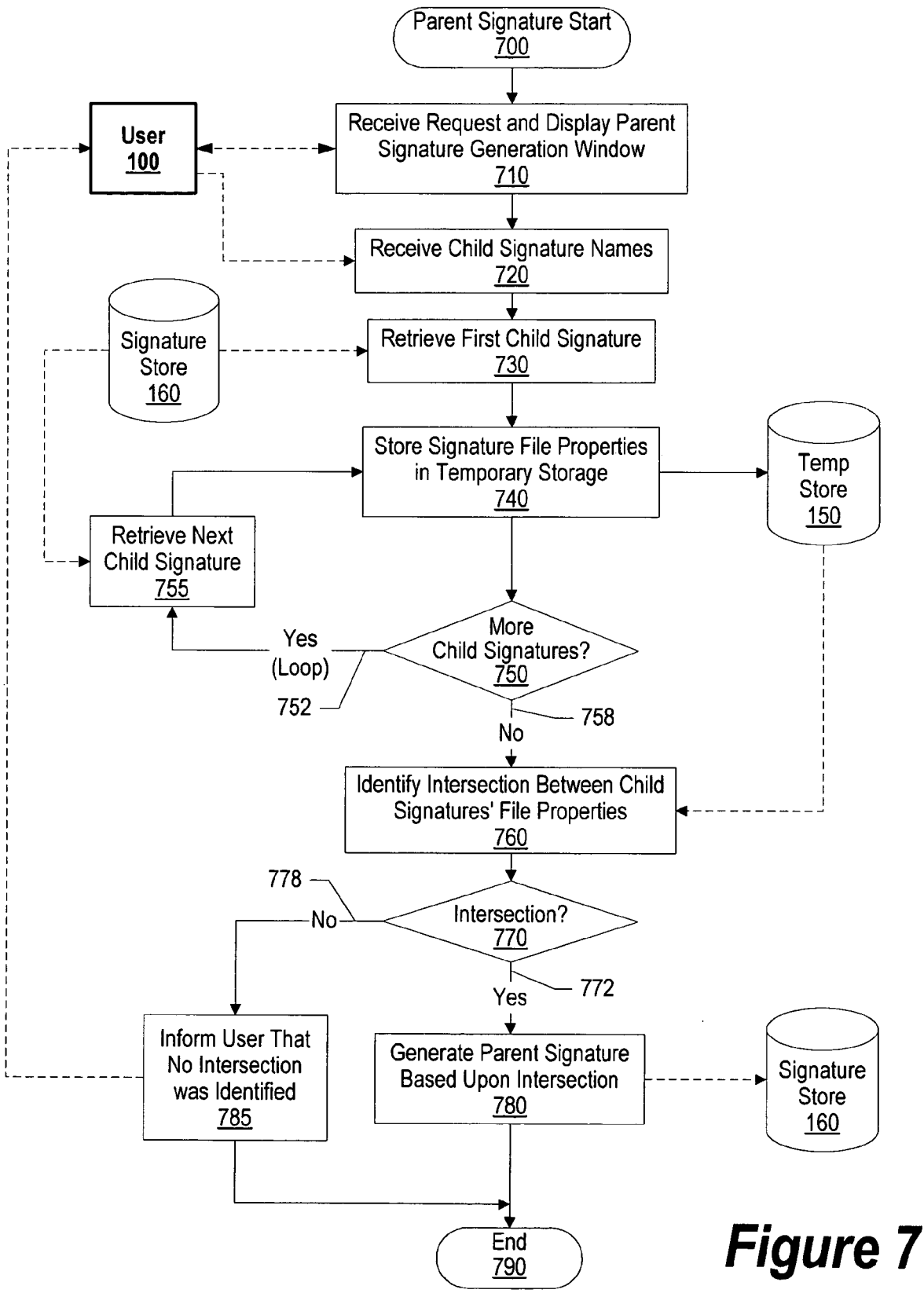
FIG. 7 is a flowchart showing steps taken in generating a parent signature.

FIG. 4 is a high level flowchart showing steps taken in generating and testing a signature. A user may wish to generate a new signature for particular content or a parent signature using existing children signatures. The flowchart shown in FIG. 4 describes steps taken in generating a new signature for particular content, whereas FIG. 7 shows steps taken in generating a parent signature using existing children signatures.

Processing commences at 400, whereupon processing receives a signature request from user 100 and displays a new signature window (step 405). The new signature window includes areas for user 100 to select particular signature attributes of the new signature (see FIG. 2A and corresponding text for further details regarding new signature window properties). User 100 is the same as that shown in FIG. 1.

At step 410, processing receives the new signature attributes from user 100. A determination is made as to whether there is an existing signature database that includes signatures (decision 420). If there is not an existing signature database, decision 420 branches to "No" branch 422 whereupon processing creates a signature database in signature store 160 at step 425. Signature store 160 is the same as that shown in FIG. 1, and may be stored on a nonvolatile storage area, such as a computer hard drive. On the other hand, if a signature database exists, decision 420 branches to "Yes" branch 428, bypassing database creation steps.

A determination is made as to whether user 100 knows the directories corresponding to the particular content (decision 430). The new signature window includes an area for user 100 to either provide the known directories or provide the location of the content's executable file.

If user 100 knows the directories, decision 430 branches to "Yes" branch 432 whereupon processing stores the directories in temporary directory store 437 at step 435. Temporary directory store 437 may be stored on a volatile or nonvolatile storage area, such as computer memory or a computer hard drive.

On the other hand, if user 100 does not know the directories, decision 430 branches to "No" branch 438 whereupon processing accesses an executable file in file system store 140 whose location was provided by user 100. As one skilled in the art can appreciate, user 100 may identify the location of an executable file by inspecting an icon for an executable file object and viewing the object's properties, which includes the location of the executable file.

Processing examines the contents of the executable file either by utilizing detailed knowledge of the structure of the file contents or by using general techniques, such as searching a binary file for representations of ASCII strings. In either case, processing extracts references to other files that are related to the executable file, such as library files or configuration files, (step 445).

At step 450, processing locates the particular files within file system store 140. For example, if the executable file "Program.exe" uses files "fileA.dll" and "fileB.dll," processing locates the files in a particular directory, such as "†pgmdllfiles." At step 455, processing stores the directories corresponding to locations of the files in temporary directory store 437.

Figure 5:
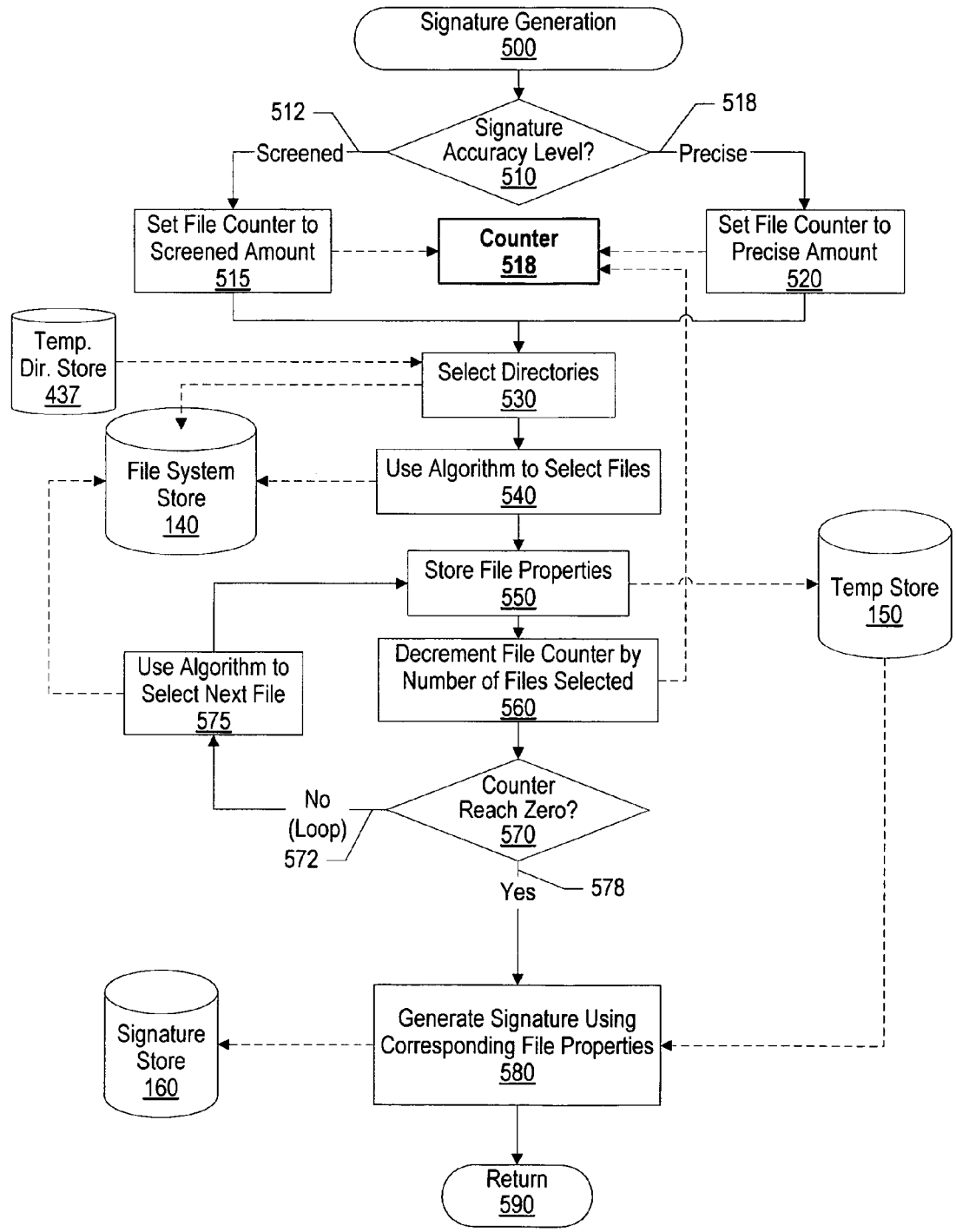
FIG. 5 is a flowchart showing steps taken in generating a signature.

Processing uses the files and directories to generate a signature and stores the signature in signature store 160 (pre-defined process block 460, see FIG. 5 and corresponding text for further details). The signature includes a particular number of the identified files and directories based upon whether user 100 wishes to create a signature with a screened accuracy level or a precise accuracy level. A signature with a screened accuracy level may include one or two files and directories, whereas a signature with a precise accuracy level may include five to ten files and directories (see FIGS. 2A, 3A, 3B, and corresponding text for further details regarding signature accuracy levels).

A determination is made as to whether user 100 wishes to test the newly generated signature using a test file system, which may be located on a test client (decision 470). If user 100 wishes to test the signature, decision 470 branches to "Yes" branch 478 whereupon processing tests the signature (pre-defined process block 480, see FIG. 6 and corresponding text for further details). On the other hand, if user 100 does not wish to test the signature, decision 470 branches to "No" branch 472 bypassing signature-testing steps. Processing ends at 490.

FIG. 5 is a flowchart showing steps taken in generating a signature. Processing received a signature request along with new signature attributes in FIG. 4. The new signature attributes include an accuracy level and may include the content's file locations.

Processing commences at 500, whereupon a determination is made as to whether the signature should have a screened accuracy level or a precise accuracy level (decision 510). A screened signature includes less files and directories than a precise signature. Therefore, a screened signature is faster than a precise signature at analyzing a file system for content but, however, its results are not as accurate as a precise signature.

If the signature should have a screened accuracy level, decision 510 branches to "Screened" branch 512 whereupon processing sets file counter 518 to a file quantity corresponding to the number of files and directories to include into a screened signature (step 515). The value of file counter 518 may be a fixed value (e.g., between one and five), a percentage of the number of files found in the content itself (e.g., 2%), or may be the result of a performed calculation, such as the higher number of either 2% of the content's files or the number "5." File counter 518 may be stored on a volatile storage area, such as computer memory.

On the other hand, if the signature should have a precise accuracy level, decision 510 branches to "Precise" branch 518 whereupon processing sets file counter 518 to a file quantity corresponding to the number of files and directories to include in a precise signature (step 520). The value of file counter 518 may correspond to fixed values, such as between 5 and 10, by a percentage of the content's files, such as 4%, or by a calculation performed on such values.

At step 530, processing selects the directories in file system store 140 whose identities are stored in temporary directory store 437. File system store 140 is the same as that shown in FIG. 1. At step 540, processing uses a selection algorithm to determine which files to include in the signature. Many known selection algorithm types may be used, such as a random selection algorithm, a non-random selection algorithm, or a heuristic selection algorithm.

Random selection algorithms may have uniform probability distribution or they may have non-uniform probability distribution. For example, a random selection algorithm may have a non-uniform probability distribution that is weighted in order to choose certain types of files (e.g., executables and libraries), or weighted to avoid choosing certain types of files (e.g., temporary files or font files). Non-random selection algorithms may select files that meet certain criteria, such as executable files, files that include numbers in their names, or some combination of file properties. Heuristic selection algorithms may be tailored for specific kinds of computer systems. For example, a heuristic algorithm may include "On computers running the Unix operating system, choose all executable files and all shared object (library) files."

At step 550, processing stores the file properties of the selected files in temporary store 150 (e.g., file name and directory path). Temporary store 150 is the same as that shown in FIG. 1. Processing decrements counter 518 at step 560 to reflect the number of files selected.

A determination is made as to whether counter 518 has reached zero (decision 570). If counter 518 has not reached zero, decision 570 branches to "No" branch 572 which loops back to select (step 575) and process the next file. This looping continues until counter 518 reaches zero, at which point decision 570 branches to "Yes" branch 578.

At step 580, processing retrieves the file properties that are stored in temporary store 150, generates a signature that includes the file properties, and stores the signature in signature store 160. Processing returns at 590.

Figure 6:
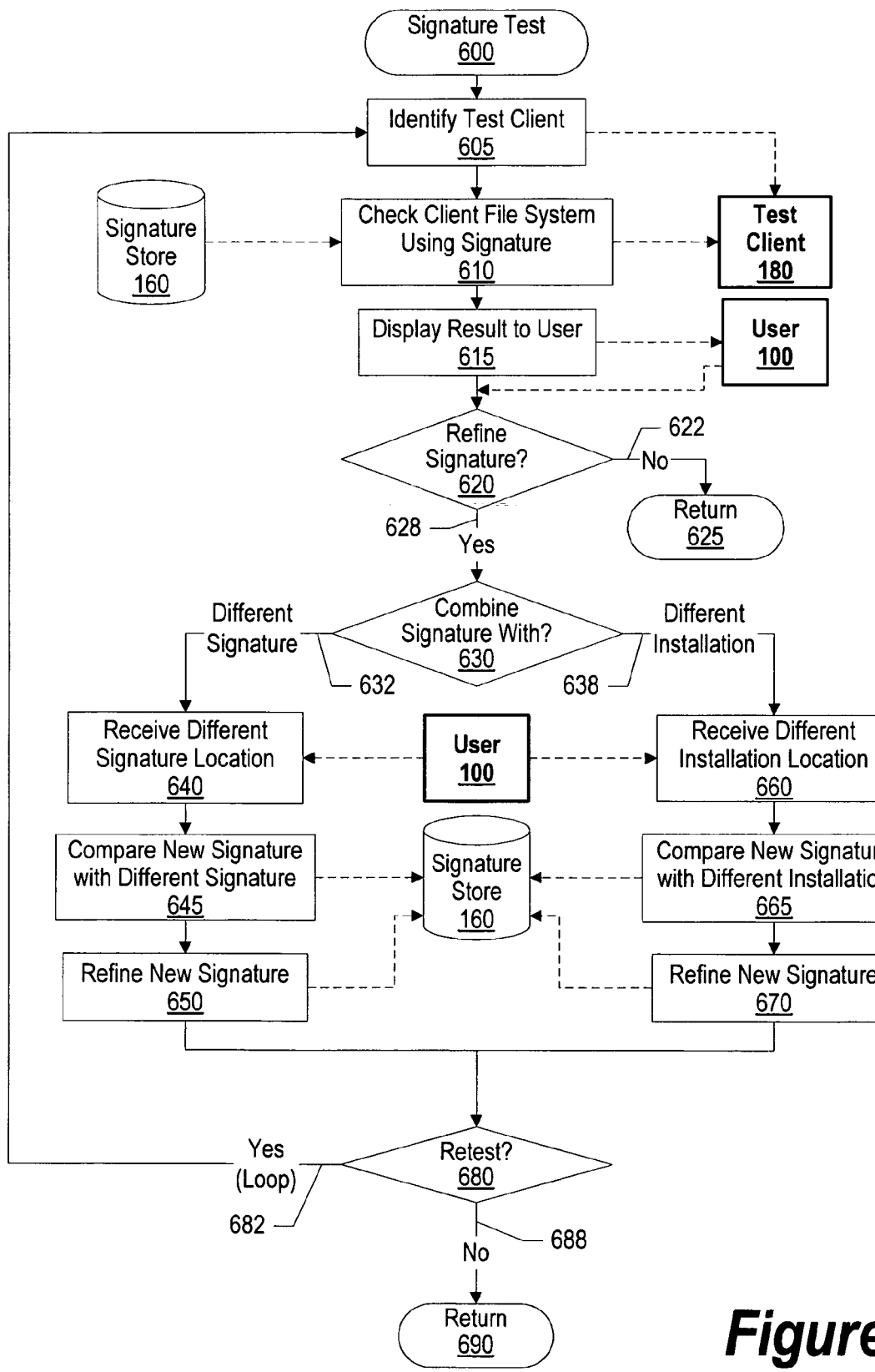
FIG. 6 is a flowchart showing steps taken in testing a signature.

FIG. 6 is a flowchart showing steps taken in testing a signature. A user may wish to test a signature using a test file system. A test file system is a file system whose content is known and, therefore, the user knows what the test result should be when tested with the signature.

Processing commences at 600, whereupon processing identifies test client 180 at step 605. In one embodiment, a user (user 100) informs processing as to which test client to use. At step 610, processing employs a matching algorithm that compares the signature located in signature store 160 to the contents of test client 180's file system, and determines whether the file system contains the content corresponding to the signature. For example, a matching algorithm may look for the presence of each file included in the signature in the file system. As one skilled in the art can appreciate, the use of more sophisticated algorithms, such as a Hausdorf metric algorithm, produces significantly more accurate results. Processing displays the results, such as "File system X includes ABC content," to user 100 at step 615. Test client 180 and user 100 are the same as that shown in FIG. 1.

A determination is made as to whether user 100 wishes to refine the signature, such as if the test provided inaccurate results (decision 620). If user 100 does not wish to refine the signature, decision 620 branches to "No" branch 622 whereupon processing returns at 625.

On the other hand, if user 100 wishes to refine the signature, decision 620 branches to "Yes" branch 628 whereupon a determination is made as to whether user 100 wishes to combine the signature with a different signature or combine the signature with a different software installation in order to refine the signature (decision 630). For example, an older signature may exist with similar file properties, and combining the older signature with the new signature may generate a more accurate signature. In another example, a different software installation may exist that has slightly different properties than the software installation that was used to create the signature, such as slightly different directories and/or file names. By combining the new signature with the properties of the different software installation, the new signature may be modified to make it more accurate.

If user 100 wishes to combine the new signature with a different signature, decision 630 branches to "Different Signature" branch 632 whereupon processing receives a different signature location from user 100 and, at step 645, processing compares the different signature with the new signature that is located in signature store 160.

Based on the comparison, processing refines the new signature at step 650. For example, the comparison may reveal that the different signature has four out of six of the same files and directories as the new signature. In this example, processing may refine the new signature by removing the two uncommon files and directories.

On the other hand, if user 100 wishes to combine the new signature with a different software installation, decision 630 branches to "Different Installation" branch 638 whereupon processing receives the different installation location from user 100 at step 660. The different installation may reside on a local file system or the different installation may reside on a remote file system that is located at a client.

Processing compares the new signature with the different software installation at step 665 and, based on the comparison, processing refines the new signature at step 670. For example, the new signature may include six files but only five of the files match the different installation. In this example, processing removes the new signature's file that does not match the different software installation.

A determination is made as to whether user 100 wishes to retest the refined signature (decision 680). If user 100 wishes to retest the refined signature, decision 680 branches to "Yes" branch 682 which loops back to test the refined signature. This looping continues until user 100 does not wish to retest the refined signature, at which point decision 680 branches to "No" branch 688 whereupon processing returns at 690.

FIG. 7 is a flowchart showing steps taken in generating a parent signature. A user may wish to generate a parent signature from existing "child" signatures that encompass different versions of particular content. For example, a user may wish to generate a "Program" parent signature using children signatures "program v.0," "program v.1," and "program v.2."

Processing commences at 700, whereupon processing receives a parent signature request from user 100 and, in turn, processing displays a parent signature generation window (step 710). The parent signature generation window allows user 100 to provide child signature names (see FIG. 2B and corresponding text for further details regarding parent signature window properties). At step 720, processing receives the child signature names from user 100.

Processing retrieves the first child signature from signature store 160 at step 730. Using the example described above, processing may retrieve signature "program v.0" from signature store 160. Signature store 160 is the same as that shown in FIG. 1. Processing stores the retrieved child signature's file properties in temporary store 150 at step 740. The file properties include the files and directories that are included in the signature. Temporary store 150 is the same as that shown in FIG. 1.

A determination is made as to whether there are more child signatures to retrieve (decision 750). If there are more child signatures to retrieve, decision 750 branches to "Yes" branch 752, which loops back to retrieve (step 755) and process the next child signature. This looping continues until there are no more child signatures to retrieve, at which point decision 750 branches to "No" branch 758.

Processing analyzes the child signatures' file properties for an intersection, or commonality, between the file properties. For example, if there are three child signatures and all three have five common files and directories, the child signatures' intersection is the five common files.

A determination is made as to whether an intersection exists between the child signatures (decision 770). If an intersection is identified, decision 770 branches to "Yes" branch 772 whereupon processing generates a parent signature based upon the intersection and stores the parent signature in signature store 160 (step 780). Using the example described above, processing generates a parent signature using the five common files and directories.

On the other hand, if no intersection exists between the child signatures, decision 770 branches to "No" branch 778 whereupon processing informs user 100 that there is no commonality between the child signatures (step 785). Processing ends at 790.

Figure 8:
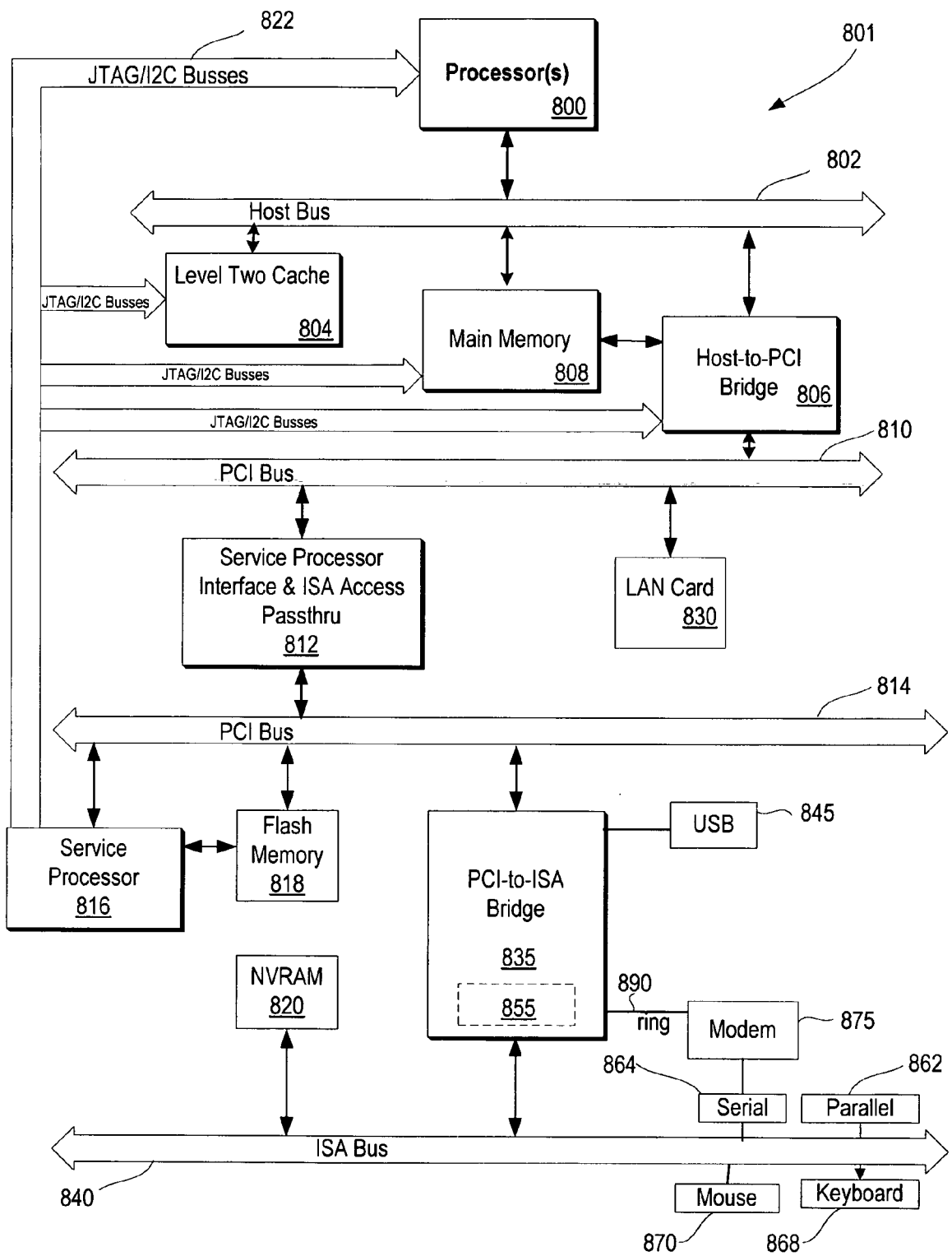
FIG. 8 is a block diagram of a computing device capable of implementing the present invention.

FIG. 8 illustrates information handling system 801 which is a simplified example of a computer system capable of performing the computing operations described herein. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 875 is connected to serial port 864 and PCI-to-ISA Bridge 835.

While the computer system described in FIG. 8 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    receiving a signature generation request that corresponds to content that resides on a file system;
    receiving signature attributes that correspond to the signature generation request, wherein the signature attributes indicate that a particular directory is unknown for which to utilize during a signature generation of the content;
    in response to the indication, accessing an executable file that is identified in the signature attributes, wherein the accessing includes identifying a dependent file that is dependent upon the executable file;
    identifying a file directory in which the dependent file resides;
    selecting a plurality of files included in the identified file directory using a selection algorithm; and
    generating the signature using the selected plurality of files.

2. The method of claim 1 further comprising:
    identifying a test file system;
    testing the signature using the test file system;
    determining whether to refine the signature based upon the testing; and
    refining the signature in response to the determination.

3. The method of claim 2 wherein the refining further comprises:
    determining to combine the signature with different content;
    receiving a different content location;
    comparing the signature with the different content at the different content location; and
    modifying the signature based upon the comparing.

4. The method of claim 1 wherein the selection algorithm is a random selection algorithm that utilizes a weighted non-uniform probability distribution to select the one or more files.

5. An information handling system comprising:
    one or more processors;
    a memory accessible by at least one of the processors;
    a nonvolatile storage area accessible by at least one of the processors;
    a set of instructions stored in the memory and executed by at least one of the processors in order to perform actions of:
        receiving a signature generation request that corresponds to content that resides on a file system located in one of the nonvolatile storage areas;
        receiving signature attributes that correspond to the signature generation request, wherein the signature attributes indicate that a particular directory is unknown for which to utilize during a signature generation of the content;
        in response to the indication, accessing an executable file that is identified in the signature attributes, wherein the accessing includes identifying a dependent file that is dependent upon the executable file;
        identifying a file directory in which the dependent file resides on one of the nonvolatile storage devices;
        selecting a plurality of files included in the identified file directory using a selection algorithm; and
        generating the signature using the selected plurality of files.

6. The information handling system of claim 5 wherein the set of instructions further performs actions of:
    identifying a test file system;
    testing the signature using the test file system;
    determining whether to refine the signature based upon the testing; and
    refining the signature in response to the determination.

7. The information handling system of claim 6 wherein the set of instructions further performs actions of:
    determining to combine the signature with different content;
    receiving a different content location;

comparing the signature with the different content at the different content location; and modifying the signature based upon the comparing.

8. The information handling system of claim 5 wherein the selection algorithm is a random selection algorithm that utilizes a weighted non-uniform probability distribution to select the one or more files.

9. A computer program product stored in a computer readable medium, comprising functional descriptive material that, when executed by an information handling system, causes the information handling system to perform actions that include:

receiving a signature generation request that corresponds to content that resides on a file system;

receiving signature attributes that correspond to the signature generation request, wherein the signature attributes indicate that a particular directory is unknown for which to utilize during a signature generation of the content;

in response to the indication, accessing an executable file that is identified in the signature attributes, wherein the accessing includes identifying a dependent file that is dependent upon the executable file;

identifying a file directory in which the dependent file resides;

selecting a plurality of files included in the identified file directory using a selection algorithm; and generating the signature using the selected plurality of files.

10. The computer program product of claim 9 wherein the information handling system further performs actions of:

identifying a test file system;

testing the signature using the test file system;

determining whether to refine the signature based upon the testing; and refining the signature in response to the determination.

11. The computer program product of claim 10 wherein the information handling system further performs actions of:

determining to combine the signature with different content;

receiving a different content location;

comparing the signature with the different content at the different content location; and modifying the signature based upon the comparing.

12. The computer program product of claim 9 wherein the selection algorithm is a random selection algorithm that utilizes a weighted non-uniform probability distribution to select the one or more files.

* * * * *